(12) United States Patent
Deng

(10) Patent No.: US 8,384,356 B2
(45) Date of Patent: Feb. 26, 2013

(54) SELF CONTAINED POWER SOURCE

(76) Inventor: Qi Deng, San Ramon, CA (US)

( * ) Notice: Subject to any disclaimer, the term of this patent is extended or adjusted under 35 U.S.C. 154(b) by 499 days.

(21) Appl. No.: 12/567,366

(22) Filed: Sep. 25, 2009

(65) Prior Publication Data

US 2011/0074359 A1  Mar. 31, 2011

(51) Int. Cl.
*H02J 7/00* (2006.01)

(52) U.S. Cl. ........ 320/140; 320/101; 320/139; 320/141; 320/145; 323/901; 323/906

(58) Field of Classification Search .................. 320/101, 320/139–141, 145; 323/901, 906, 259, 282, 323/285, 301, 344
See application file for complete search history.

(56) References Cited

U.S. PATENT DOCUMENTS

| 4,695,785 A | * | 9/1987 | Mieth et al. | 323/222 |
| 4,962,349 A | * | 10/1990 | Albach et al. | 323/265 |
| 6,081,104 A | * | 6/2000 | Kern | 323/268 |
| 6,118,258 A | * | 9/2000 | Farine et al. | 323/222 |

* cited by examiner

*Primary Examiner* — Edward Tso
*Assistant Examiner* — Manuel Hernandez
(74) *Attorney, Agent, or Firm* — Oakwood Law Group, LLP; Jie Tan

(57) ABSTRACT

A self-contained power source to charge a battery and/or power a load is provided. The power source does not utilize a connection to an external power supply, such as AC mains and/or an AC to DC converter. In one embodiment, the self-contained power source includes an ultra low voltage power generator, such as 0.3V of a single solar cell, or even lower to slightly above the GND potential, that provides a voltage to a rechargeable battery, a load or both. A voltage converter with boost topology is used to supply a voltage comparable to the voltage of the rechargeable battery. A first push circuit containing a zero threshold voltage switch, a MUX circuit and a one-pulse-control block is utilized to ensure initial and continued operation of the voltage converter.

15 Claims, 2 Drawing Sheets

SELF CONTAINED POWER SOURCE

BACKGROUND OF THE INVENTION

1. Field of the Invention

The present invention relates generally to battery charging systems and more specifically to battery chargers with self contained power sources.

2. Description of the Related Art

Typical battery-powered systems utilize an external or internal battery charging circuit. The power source to the battery charging circuit may be provided through an AC to DC converter (AC adaptor) that converts a commercially available AC power (AC mains) to a low voltage DC voltage. In addition, the DC voltage can also be used to power downstream electronics directly, which is otherwise powered by the battery when the AC adaptor is not present.

One example is a mobile handset powered by a single cell Lithium-Ion battery with a 3.6V nominal output voltage. The battery is typically charged by an AC adaptor, through a battery charging circuit. The battery charging circuit can be either a semiconductor based integrated circuit (IC) or a circuit built with discrete components. Also, within the mobile handset, there are usually 3 to 5 voltage rails, such as 5V, 3.3V, 2.5V, 1.8V, and 1.5V, etc., that are used to power other functional blocks or circuits providing specific functions for the mobile handset. These voltage rails can either be converted from the Lithium-Ion battery when an AC adaptor is not present, or converted from the DC voltage output of the AC adaptor when the AC adaptor is present.

As such, a power manager in a battery-powered system includes a battery charging circuit and a power conversion circuit. The battery charging circuit, in which power is supplied through an AC adaptor can be a circuit built with discrete components, or an IC, or a part of an IC. The power conversion circuit converts either the battery voltage or the AC adaptor provided voltage to a variety of other voltages that supply other circuits of the system. The power conversion circuit can be a circuit built with discrete components, or a collection of ICs, or an IC, or a part of an IC.

With the DC output voltage of the AC adaptor being higher than that of the battery voltage, the battery charging circuit is typically of a step-down topology, such as a linear or "buck" converter, which converts a higher DC voltage to a lower one.

For the power conversion circuit, in which the voltages utilized are higher than the nominal output voltage of the battery, a step-up or "boost" topology is used and for voltages that are lower than the nominal output voltage of the battery, a step-down or "buck" topology is used. As such, for a power conversion circuit, both step-up and step-down sub-circuits are used. These sub-circuits are typically provided as separate or independent ICs.

As such, on a system level, an AC adaptor, or other typical or external power source, is always needed. In addition, the DC output voltage of the AC adaptor needs to be above a certain level. This minimum voltage is typically between 0.7V and 1.0V, depending upon the threshold voltage of the switching device (MOSFET, bipolar transistor, etc.) used in the voltage converter. This means the DC output of the AC adaptor has to be at least 0.7V to 1.0V. In practice, the DC output of the AC adaptor is almost always higher than the battery voltage so that an easier to implement linear or buck topology can be used for the battery charging circuit. For example, the AC adaptor for a single-cell Lithium-Ion battery (3.6V nominal voltage) powered system is typically higher than 5V.

As a result, the power source is not "self-contained", i.e., power is drawn from an external power source, such as the AC mains, which greatly reduces the mobility of certain applications such as mobile handsets.

Thus, it is desirable to have a power source that is completely "self-contained". It is also desirable to include a "renewable" voltage generator that can provide power to the battery charging circuit and the power conversion circuit.

SUMMARY OF THE INVENTION

A self-contained power source for a battery charging system is provided. The power source does not utilize an external connection to a power supply, such as AC mains and an AC to DC converter. In one embodiment, the self-contained power source includes an ultra low voltage power generator that provides a voltage to the rechargeable battery, a load or both. A voltage converter with boost topology is used to supply the comparable voltage as a voltage from the rechargeable battery. A first push circuit with a MUX circuit is utilized to ensure initial and continued operation of the voltage converter.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings wherein similar reference numerals in the various figures relate to similar parts.

DESCRIPTION OF THE INVENTION

In one embodiment, a self-contained power source can include a solar cell which can be a "renewable" voltage generator. However, a typical single solar cell can only output no higher than 0.3V voltage, which is far below the 0.7V to 1.0V threshold voltage used by many current topologies to convert to higher and usable voltages.

With the single solar cell's voltage limit, a "self-contained" power source could use at least 3-5 solar cells connected in a series configuration, with at least 0.9V to 1.5V output voltage. Although this would overcome the 0.7V to 1.0V threshold voltage, it does waste or utilize resources and increase cost than if only a single solar cell is used.

A single solar cell with 0.3V output voltage, or an ultra low voltage power generator with an output voltage as low as or just slightly above the ground (GND) level, are used in a "self contained" power source that does not require an AC adaptor.

Figure 1:
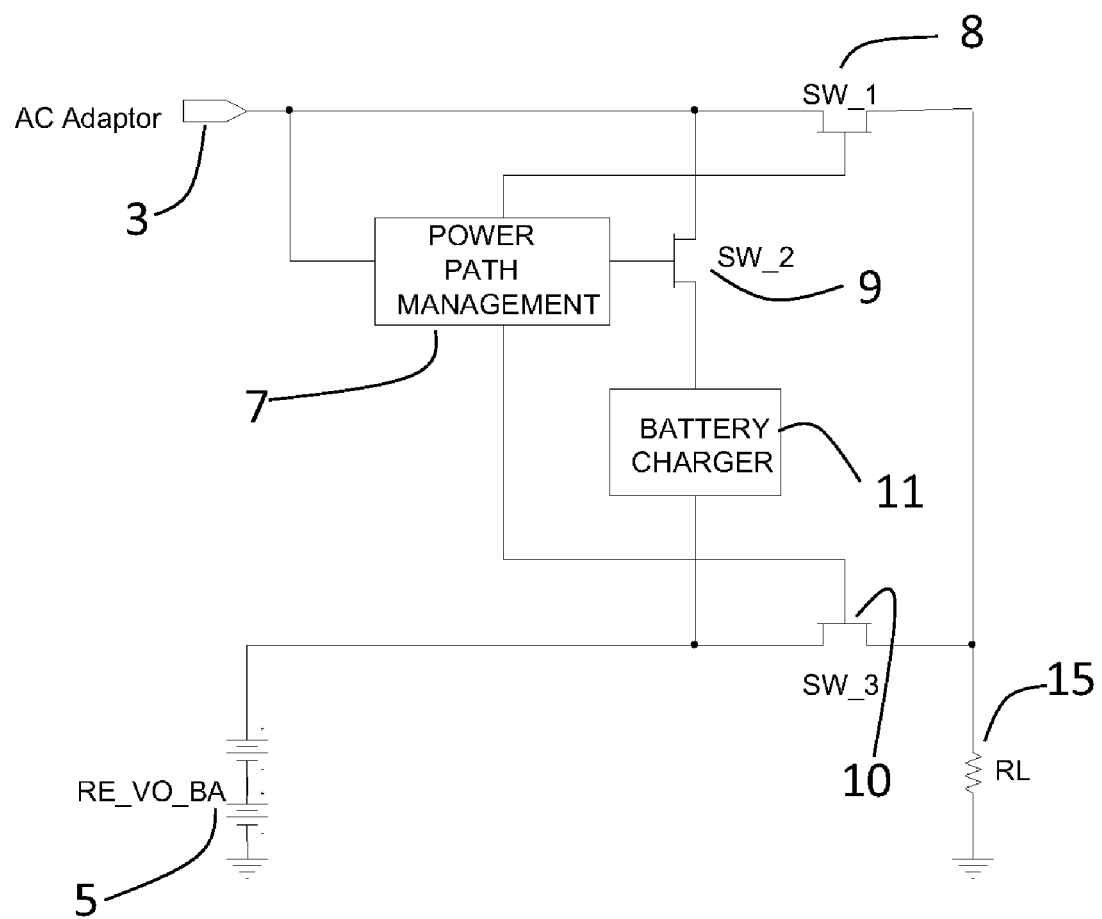
FIG. 1 is a schematic diagram of a conventional power source for a battery charging system.

A simplified illustration of a conventional power source is provided in FIG. 1. The load, $R_L$, 15, can be powered by power from an AC adaptor input 3 or a rechargeable battery, RE_VO_BA, 5. A power path management circuit 7 actuates three switches (SW_1, 8, SW_2, 9 and SW_3, 10) to control the flow of power from the AC adaptor input 3 to the load and/or battery. For example, with switch SW_1 switched on and switches SW_2 and SW_3 switched off, the AC adaptor 3 provides power to the load $R_L$, 15. With switches SW_1 and SW_2 switched on and switch SW_3 switched off, the AC adaptor 3 provides power to the load $R_L$, 15, while at the same time charges the battery RE_VO_BA, 5 through a battery charger circuit 11.

With switches SW_1, 8 and SW_3, 10 switched off and switch SW_2, 9 switched on, the AC adaptor input 3 charges the battery RE_VO_BA, 5 through the battery charger circuit 11, but the load $R_L$ is not powered. With switch SW_2 switched off, switches SW_1 and SW_3 switched on, both the AC adaptor 3 and the RE_VO_BA, 5 provide power to the load $R_L$. This can be useful when an unusually large current is required by the load $R_L$. With switches SW_1, 8 and SW_2, 9 switched off and switch SW_3, 10 switched on, the battery RE_VO_BA, 5 provides power to the load $R_L$ and thus providing the only case in which the AC adaptor input 3 is not supplying power to the load and/or battery.

As such, the power source shown is not a self-contained power source. In particular, when the battery RE_VO_BA, 5 is out of power, the AC adaptor 3 is used to charge the battery RE_VO_BA, while at the same time power the load $R_L$. Also, the AC adaptor input voltage is typically a DC voltage coming from an external AC to DC converter. The AC to DC converter is plugged into AC mains in order to provide a DC voltage as the AC adaptor input.

Figure 2:
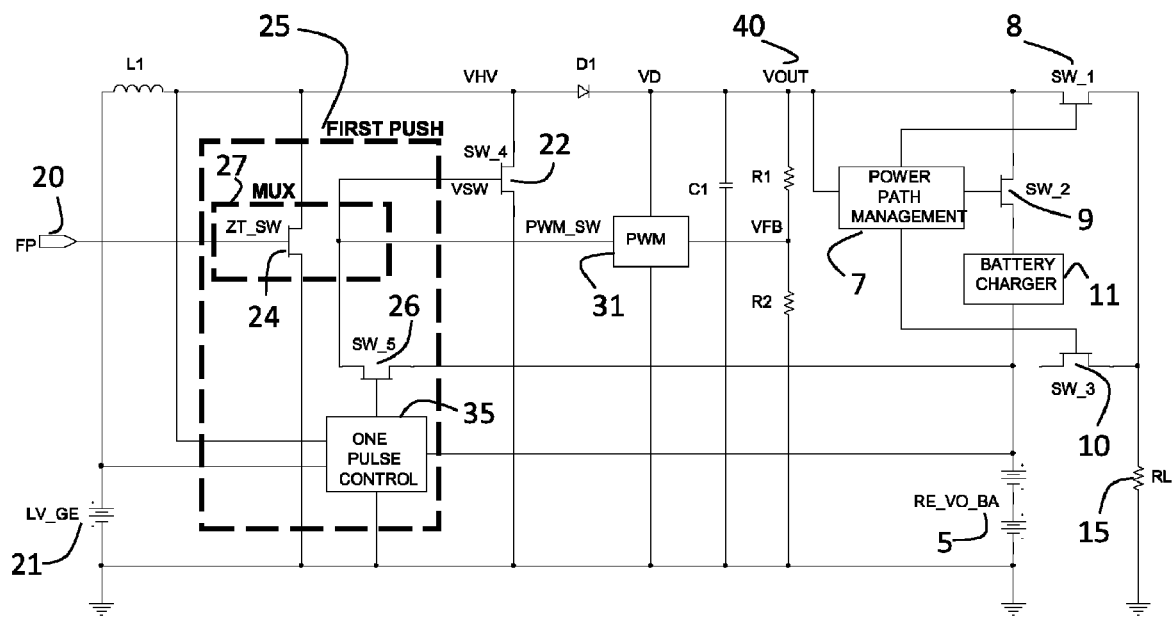
FIG. 2 is a schematic diagram of a self-contained power source and ultra low voltage generator in accordance with various embodiments of the present invention.

By adding another power generator to the battery RE_VO_BA, 5, the AC to DC converter can be eliminated. Also, the additional power generator, as opposed to an AC to DC converter, can provide a low voltage and be included in the power source. Referring to FIG. 2, the voltage of the added power generator LV_GE, 21 can be quite low, such as 0.3V of a single solar cell, or even lower to slightly above the ground GND.

The ultra low voltage power generator LV_GE, 21 ultimately provides a voltage that charges the battery RE_VO_BA, 5 with a voltage higher than the typical output voltage of the battery. Additionally, the same voltage can also be used to power the load $R_L$, 15. In particular, a voltage converter with boost topology is also included in the power source. The voltage converter converts the output voltage from the power generator LV_GE, 21 to a voltage that is in the same range as the output voltage from battery RE_VO_BA, 5.

A first push circuitry 25 is also included that ensures the main switch SW_4, 22 of the voltage converter to be turned on the very first time. The first push circuitry includes a "MUX" circuit 27 that selects between the output of battery RE_VO_BA, 5 as the "first push" signal and the output of a pulse width modulation circuit PWM_SW, 31. The selected signal is passed to the control terminal of the main switch SW_4. Operationally, the battery RE_VO_BA first push signal turns on the switch SW_4 for the very first time, and the PWM circuit controls the switch SW_4 during subsequent normal operations. The first push circuitry 25 also includes a zero-threshold-voltage switch ZT_SW, 24 that can be turned on with an external input signal FP 20.

When the battery RE_VO_BA, as the first push signal, is selected, a one pulse control circuit 35 outputs a single pulse to turn on the switch SW_4, 22 for the very first time, through an intermediate switch SW_5, 26, that connects and disconnects the battery RE_VO_BA, 5 to the MUX circuit 27. The battery charger 11 also uses the output voltage $V_{OUT}$, 40 from the voltage converter, as input to charge the battery RE_VO_BA, 5.

The power path management circuit 7 determines whether the output voltage of the voltage converter $V_{OUT}$ or the battery RE_VO_BA, 5 is to be used to power the load, and also whether the battery RE_VO_BA, 5 is to be charged. As such, the power path management circuit 7 uses multiple of switches SW_1 8, SW_2, 9 and SW_3, 10 to determine the output voltage flow path to the load, the battery or both.

In operation, when the ultra low power generator LV_GE is inserted to the circuit, if the output voltage of the battery RE_VO_BA, 5 is higher than the threshold voltage of the switch SW_4, 22, the one pulse control circuit 35 outputs a single pulse to turn on and then turn off the switch SW_5, 26. While the switch SW_5, 26 is on, it passes the voltage of the battery RE_VO_BA to the MUX circuit 27. The MUX circuit 27 passes the voltage to the control terminal of the switch SW_4. Since the battery RE_VO_BA voltage is higher than the threshold voltage of the switch SW_4, the switch turns on the very first time. For example, if the battery RE_VO_BA voltage is from a single cell Lithium-Ion battery with some 3.6V nominal voltage, even if it is deeply depleted, the supplied voltage is higher than the threshold voltage of the switch SW_4, 22, which is typically 0.7V to 1.0V, and as such, the switch SW_5, 26 will usually be turned on by the battery RE_VO_BA, 5.

After the switch SW_4, 22 turns on the very first time, the voltage converter with the boost topology, powered by the power generator LV_GE, 21, operates normally and outputs a voltage, $V_{OUT}$, that is in the same range as the battery RE_VO_BA, but higher with a small margin. For example, if the battery RE_VO_BA is a single cell Lithium-Ion battery with a 3.6V nominal voltage and 4.2V maximum voltage, the output of the voltage converter, $V_{OUT}$, is typically 5V. This is typical as the battery charger circuit 11 uses a voltage that is higher than that of the battery itself to actually charge the battery, which is required by the linear or buck topology of the charger. The load can be powered by either 3.6V or 5V.

If the battery RE_VO_BA is depleted to the point that its output voltage is lower than the threshold voltage of the SW_4, an external signal FP 20 can be applied to the control terminal of a zero-threshold-voltage switch ZT_SW, 24 which becomes the switch that provides the "first push" to the voltage converter.

As such, the power source in FIG. 2 is "self contained" and does not utilize external power sources, such as the AC mains, and an AC to DC converter. The power source allows an ultra low voltage generator, such as a single solar cell, to be used as either the main power source, or an auxiliary power source that is used to charge the main battery. Various other embodiments and details of the voltage converter, switches and other components described throughout the specification are described in the above-referenced and incorporated application.

A self-contained power source for a battery charger system is provided. Although the present invention has been described in certain specific embodiments, many additional modifications and variations would be apparent to those skilled in the art.

Although the present invention has been described in certain specific embodiments, many additional modifications and variations would be apparent to those skilled in the art. It is therefore to be understood that the present invention may be practiced otherwise than specifically described, including various changes in the size, shape and materials, without departing from the scope and spirit of the present invention.

Thus, embodiments of the present invention should be considered in all respects as illustrative and not restrictive.

What is claimed is:

1. In a circuit having a self contained DC/DC power source comprising:
   a first power source of a rechargeable battery;
   a second power source for providing a potential that is less than 0.4 volts;
   a boost voltage converter coupled to the second power source to boost the voltage of the second power source to a voltage that is at least equal to the voltage of the first power source;
   said boost voltage converter having an inductor and a switching device connected in series with said second power source; a diode in series with a capacitor coupled across the switching device; a voltage divider coupled across the capacitor; a pulse width modulator coupled across the voltage divider to receive an input from the voltage divider to provide an input to a control terminal of the switching device;
   a first push circuit having a one-pulse control circuit, coupled to the first power source, the second power source and the control terminal of the switching device in the boost voltage converter wherein said one-pulse control circuit generates a single pulse to turn on the switching device for the first time and the pulse width modulator circuit controls the switching device during subsequent normal operations;
   a power path management circuit connected to the output voltage of the boost voltage converter in series, and coupled to the control terminals of multiple switches; and
   a battery charger circuit coupled to the output voltage of the boost voltage converter through a switch, of which the control terminal is coupled to the power path management circuit;
   wherein said battery charger circuit has an output coupled to the first power source to provide a charging current to the first power source.

2. The circuit having a self contained DC/DC power source of claim 1 wherein the first push circuit ensures that the switching device in the boost voltage converter is turned on the very first time.

3. The circuit having a self contained DC/DC power source of claim 2 wherein the first push circuit includes a MUX circuit.

4. The circuit having a self contained DC/DC power source of claim 3 wherein the MUX circuit selects between the output of the first power source as the first push signal and the output of the pulse width modulator circuit as the signal that is passed to the control terminal of the switching device.

5. The circuit having a self contained DC/DC power source of claim 4 wherein when the first push signal is provided from said first power source, said one pulse control circuit generates a single pulse to turn on the switching device for the first time and the pulse width modulator circuit controls the switching device during subsequent normal operations.

6. The circuit having a self contained DC/DC power source of claim 3 wherein the first push circuit also includes a zero threshold voltage switch.

7. The circuit having a self contained DC/DC power source of claim 6 wherein the zero threshold voltage switch can be turned on by an external input signal.

8. The circuit having a self contained DC/DC power source of claim 7 wherein the zero threshold voltage switch, when the output voltage of the first power source is not sufficient to provide the first push signal to turn on the switching device for the first time, is turned on by the external input signal to turn on the switching device for the first time.

9. The circuit having a self contained DC/DC power source of claim 1 wherein the output of the boost voltage converter provides a voltage that is higher than the voltage of the second power source to charge the first power source, or power a load, or both.

10. The circuit having a self contained DC/DC power source of claim 9 wherein the output of the boost voltage converter provides a voltage that is at least equal to the first power source in order to power a load.

11. The circuit having a self contained DC/DC power source of claim 9 wherein the output of the boost voltage converter provides a voltage that is higher than the first power source in order to charge the first power source, or power a load, or both.

12. The circuit having a self contained DC/DC power source of claim 9 wherein said power path management circuit uses multiple switches to determine whether the output voltage of the boost voltage converter or the first power source, or both, are to be used to power a load, and whether the first power source is to be charged by the battery charger circuit.

13. The circuit having a self contained DC/DC power source of claim 1 wherein the second power source provides a potential that is less than 0.3 volts.

14. The circuit having a self contained DC/DC power source of claim 1 wherein the second power source provides a potential that is less than 0.2 volts.

15. The circuit having a self contained DC/DC power source of claim 1 wherein the second power source provides a potential that is slightly above ground potential.

* * * * *